United States Patent

Dryburgh

[15] 3,648,938
[45] Mar. 14, 1972

[54] WINDING OF ELECTRIC MOTORS

[72] Inventor: Paul E. Dryburgh, Owosso, Mich.
[73] Assignee: Universal Electric Company, Owosso, Mich.
[22] Filed: Aug. 5, 1970
[21] Appl. No.: 61,178

[52] U.S. Cl..........................................242/1.1 E, 310/180
[51] Int. Cl.......................................................B65h 81/06
[58] Field of Search...................310/180, 179, 184, 185, 187, 310/194, 254, 258, 259; 29/155.57, 205, 596; 242/1.1, 1.1 E

[56] References Cited

UNITED STATES PATENTS

| | | | |
|---|---|---|---|
| 3,281,084 | 10/1966 | Lill | 242/1.1 E |
| 3,345,001 | 10/1967 | Straub | 242/1.1 E |
| 3,557,432 | 1/1971 | Pavesi | 29/596 |
| 3,407,468 | 10/1968 | Baldwin | 29/205 |
| 2,743,508 | 5/1956 | Isaacson | 29/155.57 |
| 3,244,918 | 4/1966 | Pennell | 310/254 |
| 3,366,812 | 1/1968 | Summerfield | 310/254 |
| 3,441,228 | 4/1969 | Henry | 242/1.1 |

Primary Examiner—L. T. Hix
Assistant Examiner—R. Skudy
Attorney—Barnes, Kisselle, Raisch & Choate

[57] ABSTRACT

An apparatus for facilitating the winding of stators of electric motors comprising a pair of shroud members and interengaging means between the shroud members and the poles of the stator to support the shroud members on the stator. Each shroud member has a surface for guiding the wire as it is wound about the poles.

18 Claims, 7 Drawing Figures

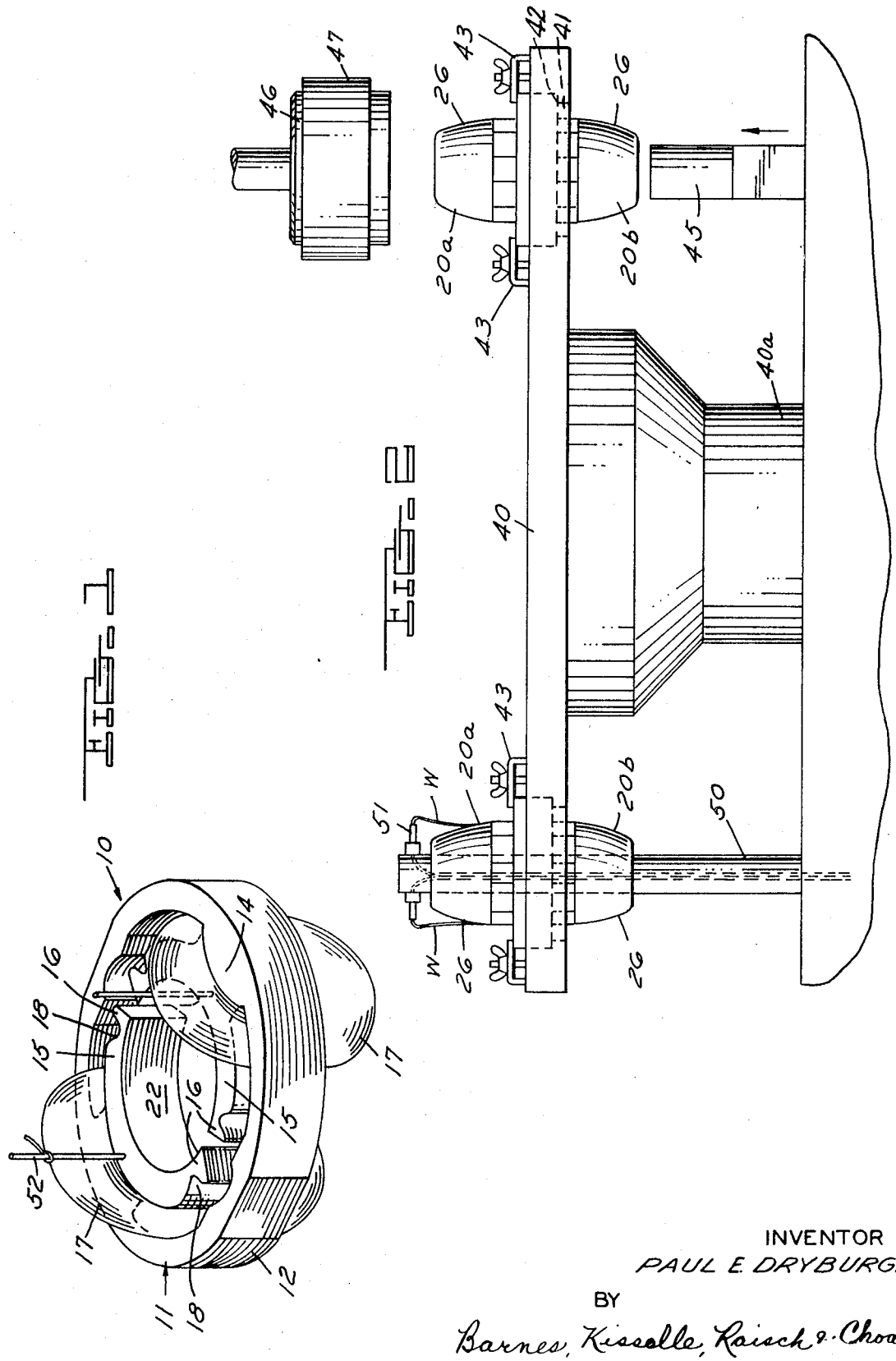

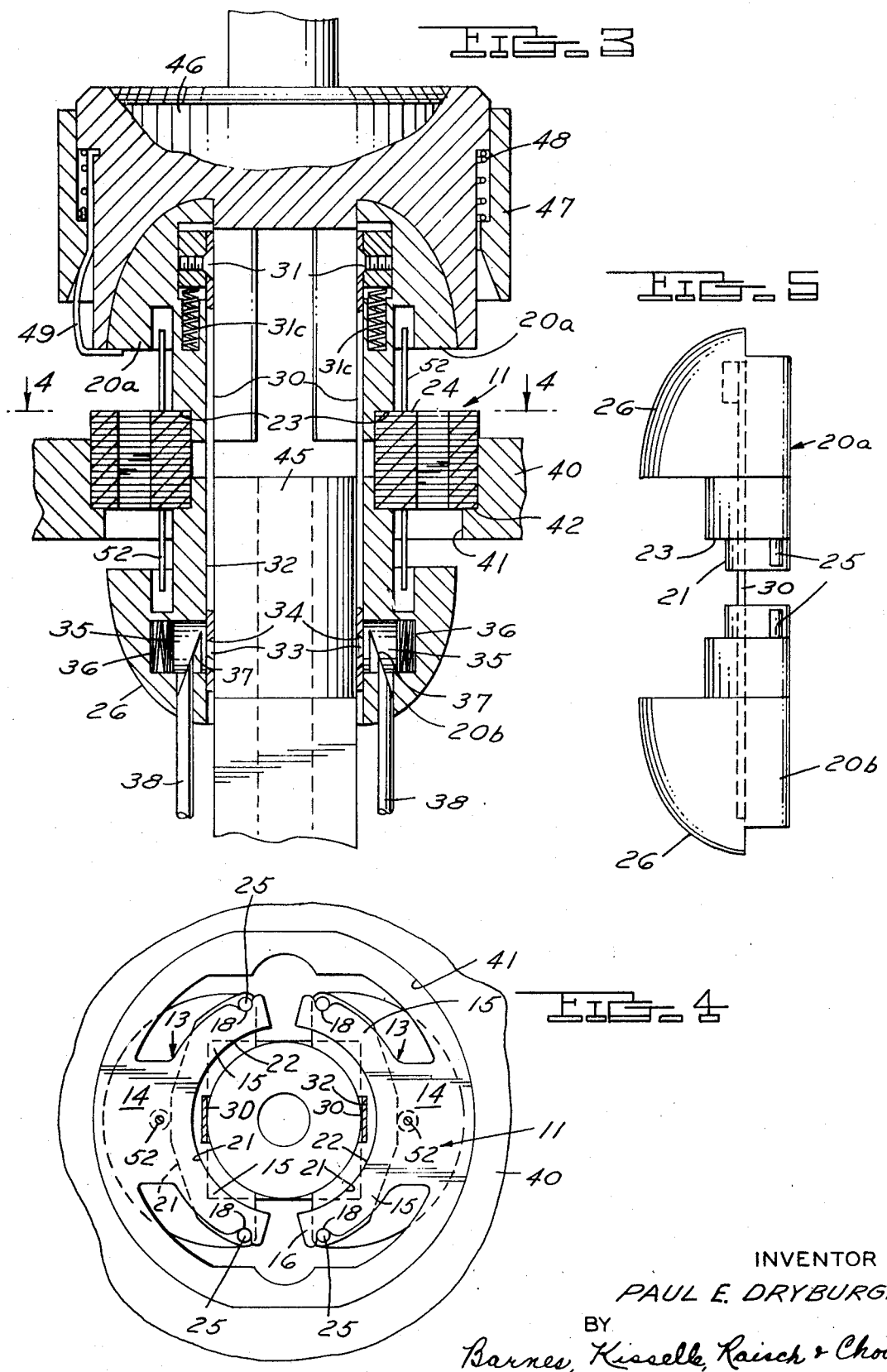

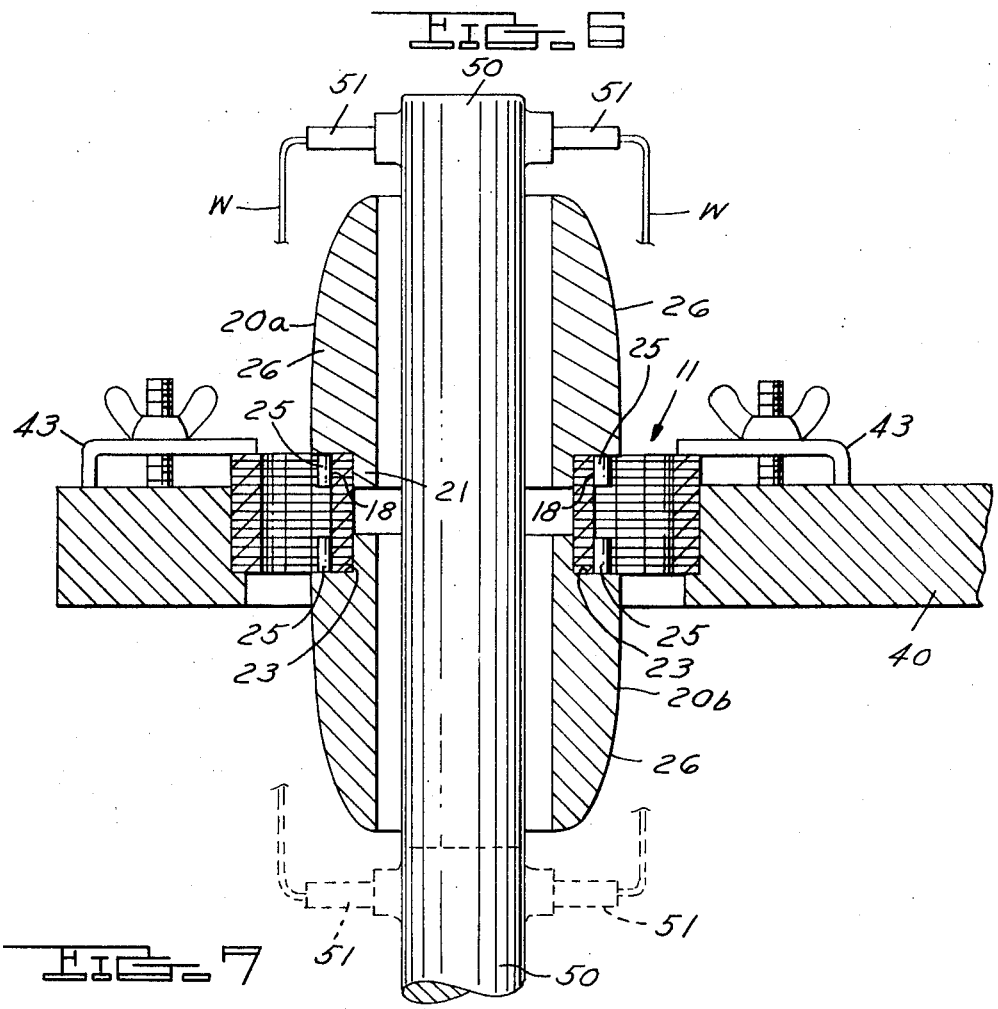
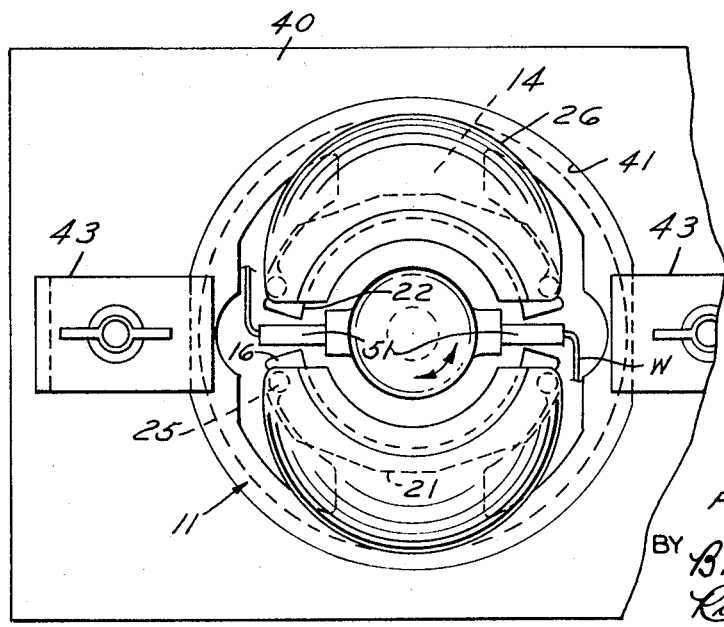

WINDING OF ELECTRIC MOTORS

This invention relates to electric motors and particularly to winding the coils about the poles of electric motors.

BACKGROUND OF THE INVENTION

Electric motors often comprise a stator which has a plurality of circumferentially spaced poles extending radially inwardly, each pole having a central area and circumferentially diverging portions defining pole tips about a cavity. It is common to wind the coils about the central portions of the pole tips on apparatus which includes guide surfaces for guiding the wires toward the central portion. One of the problems with respect to such apparatus is that the resultant stator and coils have substantial, unnecessary and undesirable air gaps between the outer periphery of the coils and the stator.

Among the objects of the invention are to provide a novel apparatus and stator construction wherein the resultant stator will have minimum or no air gaps between the coils and stator; wherein the stator and shroud members can be handled as an entity and transferred to a winding station; wherein the structure is relatively simple and results in a tight winding of the coil with a resultant saving of wire.

SUMMARY OF THE INVENTION

In accordance with the invention, an apparatus is provided for facilitating the winding of stators of electric motors comprising a pair of shroud members and interengaging means between the shroud members and the poles of the stator to support the shroud members on the stator. Each shroud member has a surface for guiding the wire about the poles. More specifically, the stator has specific locating surfaces that are engaged by locating members on the shroud members. The shroud members on opposite sides of the stator interengage one another to urge the shroud members against the sides of the stator.

DESCRIPTION OF THE DRAWINGS

FIG. 1 is a perspective view of a stator having coils wound thereon in accordance with the invention.

FIG. 2 is a side elevational view of an apparatus for winding the coils on the stator.

FIG. 3 is a vertical sectional view through the apparatus shown in FIG. 2 showing the parts in one operative position.

FIG. 4 is a fragmentary sectional view taken along the line 4—4 in FIG. 3, parts being broken away.

FIG. 5 is a vertical sectional view through a portion of the apparatus with the stator removed.

FIG. 6 is a vertical sectional view through another portion of the apparatus.

FIG. 7 is a plan view of the portion of the apparatus shown in FIG. 6.

DESCRIPTION

Referring to FIG. 1, the stator assembly 10 which is to be made in accordance with the invention comprises a stator 11 formed with a plurality of laminations 12. Each lamination includes an annular portion and radially inwardly extending poles 13. Each pole 13 has a central portion 14, diverging pole portions 15 ending in pole tips 16 (FIGS. 1 and 4). A coil 17 of wire is wound around the central portion 14 of each pole 13, as presently described.

In accordance with the invention, each pole tip 16 includes an outwardly opening locating groove 18, such that the grooves 18 on opposite tips 16 of the same pole 13 are oppositely directed.

Further, in accordance with the invention, a pair of shroud members 20a, 20b is associated with each pole 13. Each shroud member 20a, 20b includes the arcuate axial contacting surface 21 for engaging the inner surface 22 of each pole, a second radial contacting surface 23 for engaging the axially outermost surface of each pole and laterally spaced locating pins 25 which engage the locating grooves 18 of each pole. Finally, each shroud member 20a, 20b includes a guiding surface 26 which is generally convex both horizontally and vertically.

Interengaging means are provided between the opposite shroud members to hold them in position on each side of the stator 11. As shown in FIGS. 3 and 5, this comprises a member or strap 30 that is fastened at one end by a screw 31 to a slide block 31a slidably mounted in a groove 31b and yieldingly urged outwardly by a spring 31c in one of the shroud members 20a. Strap 30 projects through a groove 31 in the shroud member to a corresponding groove 32 in the opposite shroud member. The opposite shroud member 20b includes latching mechanism including a springloaded pin 33 that is adapted to extend into an opening 34 in the lower end of the strap 30 to releasably attach the end of the strap 30. In this manner, the opposed shroud members 20a, 20b are locked under a spring force in position on opposite sides of the stator, it being understood that a pair of shroud members 20a, 20b is provided for each pole.

Each pin 33 is mounted on a plunger 35 that is urged outwardly by a spring 36. The plunger 35 includes an inclined surface 37 that is adapted to be engaged by an externally provided tool 38 to retract the plunger and permit removal and disassembly of shroud members 20a, 20b from the stator.

In practice, the apparatus shown in FIG. 2 is utilized in association with the stators and shroud members and comprises a table 40 mounted for rotation about a vertical axis on a post 40a. The table 40 includes vertical openings 41 having a shoulder 42 (FIGS. 3, 4). Each vertical opening 41 has a configuration corresponding to that of a stator 11. A stator 11 is positioned in opening 41 contacting the shoulder 42 and is clamped by the use of clamps 43. Shroud members 20b are then supported on a lower plunger 45 which is vertically movable up and down at the loading station. Shroud members 20a are mounted in vertically movable plunger 46, the latter having a collar 47 that is yieldingly urged outwardly by a coil spring 48 and locating springs 49 that engage the lower end of the shroud members 20a. With shroud members 20a, 20b thus located, plungers 45, 46 are actuated to move the shrouds 20a, 20b into position, locating them on the stator and causing the straps 30 on shroud members 20a to interlock with shroud members 20b. Release mechanism are then actuated releasing the shrouds from plungers 45, 46. Plungers 45, 46 are then retracted.

The table 40 is then rotated to bring the assembly of the stator 11 and shroud members 20a, 20b to the winding station. At the same time, a previously wound stator is brought to the loading and unloading station where the stator can be unloaded and where a new stator and associated shroud members 20a, 20b are provided for the next cycle.

At the winding station, a winding member 50 is provided and includes needles or guides 51 that extend radially outwardly and through which wires W extend. The winding member 50 is oscillated horizontally and reciprocated vertically through the space between the shroud members to wind the wires about the central portion 14 of each pole. This general oscillating and reciprocating vertical motion is well known in the art.

During the winding, the surfaces 26 of the shroud members 20a, 20b guide the wires radially outwardly to insure that they will be wound as close to the outermost end of the central portion 14 as possible. This will insure that the coil is wound about the central portion 14 beyond the cavity of the stator. If needed, pins 52 may be provided to limit the radially inward movement of the coil, especially where the wire does not have sufficient rigidity to retain its position away from the rotor space or cavity, in order that no portion of the coil will overlap the cavity.

By use of the apparatus in accordance with the invention, it is possible to obtain a more tight coil that is without air gaps and which utilizes less wire.

After the winding operation, the further indexing of the table will result in bringing the stator with the coils wound thereon and the shroud members thereon to the unloading station where unloading of the stator with the windings or coils thereon can be achieved by insertion of the elements 38 and removal of the clamps 43.

I claim:

1. In the winding of stators, the combination comprising
a stator defining at least two radially inwardly extending poles,
each said pole having a central area and circumferentially diverging portions defining pole tips about a cavity,
a pair of shroud members positioned one on each side axially of each said pole,
each said shroud member having a guide surface for guiding a wire about the central portion of the stator,
each said shroud member and said stator having interengaging locating means individual to each said shroud for locating said shroud member circumferentially and radially with respect to said stator independently of the other said shroud member.

2. The combination set forth in claim 1 including interlocking means between said opposed shroud members for locking and yieldingly urging said shroud members axially against the sides of said stator.

3. The combination set forth in claim 2 including means for disengaging said interlocking means.

4. The combination set forth in claim 1 wherein said interengaging means comprises recesses and projections on said shroud members and stator.

5. The combination set forth in claim 4 wherein said recesses are provided in said stator and said projections are provided on said shroud members.

6. The combination set forth in claim 5 wherein each said recess comprises a circumferentially outwardly opening slot.

7. In the winding of stators, the combination comprising
a table having at least two stator-supporting stations,
a stator defining at least two radially inwardly extending poles,
each said pole having a central area and circumferentially diverging portions defining pole tips about a cavity,
a pair of shroud members positioned one on each side axially of each said pole,
each said shroud member having a guide surface for guiding a wire about the central portion of the stator,
each said shroud member and said stator having interengaging locating means individual to each said shroud for locating said shroud member circumferentially and radially with respect to said stator independently of the other said shroud member,
means at one station for applying said shroud members to said stator,
means at said other station for winding coils about said poles.

8. The combination set forth in claim 7 including interlocking means between said opposed shroud members for locking and yieldingly urging said shroud members against the sides of said stator.

9. The combination set forth in claim 8 including means for disengaging said interlocking means.

10. The combination set forth in claim 7 wherein said interengaging means comprises recesses and projections on said shroud members and stator.

11. The combination set forth in claim 10 wherein said recesses are provided in said stator and said projections are provided on said shroud members.

12. The combination set forth in claim 11 wherein each said recess comprises a circumferentially outwardly opening slot.

13. In a stator adapted to facilitate winding of coils thereon, the combination comprising
a body defining at least two radially inwardly extending poles,
each said pole having a central area and circumferentially diverging portions defining pole tips about a cavity,
each said pole having spaced locating means thereon for engaging complementary locating means on a shroud member to locate the shroud member circumferentially and radially on the stator.

14. The combination set forth in claim 13 wherein said locating means comprises recesses on said stator.

15. The combination set forth in claim 14 wherein each said recess comprises a circumferentially outwardly opening slot.

16. In the winding of stators, the combination comprising
a stator defining at least two radially inwardly extending poles,
each said pole having a central area and circumferentially diverging portions defining pole tips about a cavity,
a pair of shroud members positioned one on each side axially of each said pole,
each said shroud member having a guide surface for guiding a wire about the central portion of the stator,
each said shroud member and said stator having interengaging locating means for locating said shroud member with respect to said stator,
said recesses being provided in said stator and said projections are provided on said shroud members,
each said recess comprising a circumferentially outwardly opening slot,
each said slot being provided at the outermost extremity of said pole tip.

17. In the winding of stators, the combination comprising
a table having at least two stator-supporting stations,
a stator defining at least two radially inwardly extending poles,
each said pole having a central area and circumferentially diverging portions defining pole tips about a cavity,
a pair of shroud members positioned one on each side axially of each said pole,
each said shroud member having a guide surface for guiding a wire about the central portion of the stator,
each said shroud member and said stator having interengaging locating means for locating said shroud member with respect to said stator,
means at one station for applying said shroud members to said stator,
means at said other station for winding coils about said poles,
said interengaging means comprising recesses and projections on said shroud members and stator,
said recesses being provided in said stator and said projections being provided on said shroud members,
each said recess comprising a circumferentially outwardly opening slot,
each said slot being provided at the outermost extremity of said pole tip.

18. In a stator adapted to facilitate winding of coils thereon, the combination comprising
a body defining at least two radially inwardly extending poles,
each said pole having a central area and circumferentially diverging portions defining pole tips about a cavity,
each said pole having spaced locating means thereon for engaging complementary locating means on a shroud member,
said locating means comprising recesses on said stator,
each said recess comprising a circumferentially outwardly opening slot,
each said slot being provided at the outermost extremity of said pole tip.

* * * * *